United States Patent
Oshima et al.

(10) Patent No.: US 6,501,637 B2
(45) Date of Patent: Dec. 31, 2002

(54) TRIMMER CAPACITOR

(75) Inventors: Masanori Oshima, Takefu (JP); Shuichi Taniguchi, Fukui-ken (JP); Hiroyuki Watanabe, Fukui-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/746,715

(22) Filed: Dec. 22, 2000

(65) Prior Publication Data
US 2001/0033472 A1 Oct. 25, 2001

(30) Foreign Application Priority Data
Dec. 22, 1999 (JP) .............................. 11-364757

(51) Int. Cl.⁷ .............................. H01G 5/06; H01G 5/04
(52) U.S. Cl. ........................ 361/293; 361/292; 361/287
(58) Field of Search .................. 361/287, 289, 361/292, 293, 298.1–298.5, 299.1–299.5

(56) References Cited

U.S. PATENT DOCUMENTS

| | | | | |
|---|---|---|---|---|
| 4,291,361 A | * | 9/1981 | Shirakawa | ............ 361/292 |
| 4,594,640 A | * | 6/1986 | Tatsumi | ............ 361/293 |
| 4,649,459 A | * | 3/1987 | Azuchi | ............ 361/293 |
| 5,229,912 A | * | 7/1993 | Kishishita et al. | ....... 361/298.3 |
| 5,461,535 A | * | 10/1995 | Kishishita et al. | .......... 361/293 |

* cited by examiner

Primary Examiner—Dean A. Reichard
Assistant Examiner—Eric W. Thomas
(74) Attorney, Agent, or Firm—Keating & Bennett, LLP

(57) ABSTRACT

A trimmer capacitor includes anchor portions that are arranged to be stepped down from the surface of a fixed electrode and are embedded in a stator near the upper surface of the stator at the tip portions of the fixed electrode. Because the tip portion of the fixed electrode has a section that is exactly perpendicular or nearly perpendicular to the surface of the fixed electrode in the region from the surface of the fixed electrode to the anchor portions, even if the upper surface of the stator is polished in the process for forming the stator, neither the area of the fixed electrode nor the capacitance changes.

13 Claims, 6 Drawing Sheets

TRIMMER CAPACITOR

BACKGROUND OF THE INVENTION

1. Field of the Invention

The present invention relates to a capacitor, and more particularly, the present invention relates to a trimmer capacitor in which fine adjustment of the capacitance can be made.

2. Description of the Related Art

As a conventional trimmer capacitor, there is, for example, a chip-type trimmer capacitor disclosed in Japanese Unexamined Patent Application Publication No. 6-20872. This trimmer capacitor, as shown in FIG. 5, includes a stator 31 that is integrally molded with a nearly semicircular fixed electrode 32 having anchor portions 40a and 40b disposed in the circumferential portion of the fixed electrode 32 using a resin 31a and a dielectric ceramic plate 33 defined by a ceramic plate 33a made of a dielectric material with a movable electrode 34. The upper surface of the stator 31 on which the fixed electrode is provided and the lower surface of the dielectric ceramic plate 33 on which no movable electrode 34 is provided are arranged to rotatably contact with each other. A metal adjustment shaft 35 is arranged to pass through a shaft hole 38 of the stator and a through-hole 39 of the dielectric ceramic plate 33. The tip portion of the metal adjustment shaft 35 and a metal spring (rotor spring washer) 36 are joined so that they mate with each other.

Then, in this trimmer capacitor, by rotating the dielectric ceramic plate 33 in a state in which the upper surface of the stator 31 is in contact with the lower surface of the dielectric ceramic plate 33 and by changing the area of the fixed electrode 32 opposed to the movable electrode 34, that is, the overlapping area, the amount of capacitance generated between the fixed electrode 32 and the movable electrode 34 can be adjusted.

However, in the trimmer capacitor as described above, after the fixed electrode has been integrally embedded in the resin 31, the flatness of the upper surface of the stator 31 and the surface of the fixed electrode 32 exposed over the stator is increased to improve the characteristics of the trimmer capacitor, and accordingly a process for polishing the upper surface of the stator 31 is generally required. However, in the above-described trimmer capacitor, since the stator 3 is molded using a resin and is soft, it is difficult to reliably and accurately perform the polishing, and by the process of polishing, there is in particular a problem that the fixed electrode may be removed. The removal of the fixed electrode 32 is caused by weak adhesion of the fixed electrode 32 to the resin 31a, although the fixed electrode 32 is embedded in the stator 31, and when polishing is performed while the fixed electrode 32b is removed, excessive polishing is performed, and as a result, a problem of a decrease in the capacitance of the trimmer capacitor occurs.

In the above-described trimmer capacitor, by embedding the anchor portions 40a and 40b provided on the fixed electrode 32 in addition to the lead-out portion 37 of the fixed electrode in the stator, the fixed electrode 32 is fixed at the three points and the mounting strength of the fixed electrode 32 to the stator 31 is increased.

Here, the anchor portions 40a and 40b are provided in the circumferential portion of the fixed electrode 32 and are nearly at a right angle relative to the surface of the fixed electrode 32, and the farther toward the tip portion, the larger is at least one of the width and the thickness. This is to decrease stray capacitance caused by the anchor portions and to prevent reduction of the bending strength of the stator 31.

However, in the above-described conventional trimmer capacitor, as shown in FIG. 5, the anchor portions 40a and 40b are disposed in the circumferential portion of the fixed electrode 32 and at a location where the line connecting the anchor portions 40a and 40b does not pass through the shaft hole 38 of the stator. Therefore, the tip portions 41a and 41b of the fixed electrode 32 are to be located outside a triangular area defined by connecting the anchor portions 40a and 40b and the lead-out portion 37 of the fixed electrode, and there is the possibility that the removal of the tip portions 41a and 41b of the fixed electrode cannot be prevented merely by affixing the fixed electrode 32 at the three points.

In order to solve this problem, a method of providing additional anchor portions at the tip portions 41a and 41b of the fixed electrode 32 may be considered. As a method for providing these anchor portions, there is, for example, a method disclosed in Japanese Unexamined Patent Application Publication No. 57-140731, and in this method, as shown in FIG. 6, a fixed electrode 51 is firmly affixed in a stator 53 by performing press working on the circumferential portion 52 of the fixed electrode 51 so that the fixed electrode 51 cuts into the resin material. A trimmer capacitor in which the method is used in the tip portions of a fixed electrode and anchor portions 50a and 50b are further provided to the tip portions 41a and 41b of the fixed electrode is shown in FIG. 7. In the trimmer capacitors in FIGS. 5 and 7, the same reference numerals are applied to equivalent portions. In the trimmer capacitor, because the anchor portions 50a and 50b are further disposed at the tip portions 41a and 41b of the fixed electrode, it is believed that the fixed electrode 32 is also firmly affixed at the tip portions to the stator 31 and that the floating of the fixed electrode 32 can be reliably prevented.

However, the trimmer capacitor in which the anchor portions 50a and 50b are disposed at the tip portions 41a and 41b of the fixed electrode by the above method has the following problem. FIG. 8 is an enlarged sectional view taken along line Y–Y' of the fixed electrode 32 embedded in the molded stator 31 in FIG. 7, which has not been polished. As shown in the drawing, the anchor portion 50b extends obliquely downward from the surface 32a of the fixed electrode. Accordingly, in the process of forming the stator 31, when the upper surface of the stator 31 and the surface 32b of the fixed electrode embedded in the stator 31 are polished along line A–A', the length of the fixed electrode 32 is extended in the direction of Y–Y' by L, that is, the area of the fixed electrode 32 is increased. Here, as the anchor portions 50a and 50b are located in the direction in which the movable electrode 34 opposed to the anchor portions 50a and 50b rotates, the area of the fixed electrode 32 becomes larger in the direction of the anchor portions 50a and 50b, and this means that the area opposed to the movable electrode 34, that is, the overlapping area, becomes larger, and as a result, the problem of varied capacitance in the trimmer capacitor occurs. In the process of polishing stators, since it is difficult to maintain the amount of polishing exactly constant among stators, the capacitance varies due to the polishing, and accordingly, variations in the capacitance of each stator occurs.

SUMMARY OF THE INVENTION

In order to overcome the problems described above, preferred embodiments of the present invention provide a trimmer capacitor in which in the process of forming a stator, even if the upper surface of the stator is polished in order to increase the flatness of the upper surface of the stator and the surface of the fixed electrode embedded in the stator, the capacitance does not change, and the trimmer capacitor has stable characteristics.

According to one preferred embodiment of the present invention, a trimmer capacitor includes a stator on the upper surface of which a substantially semicircular fixed electrode is mounted, and a dielectric ceramic plate on the upper surface of which a movable electrode is mounted, the lower surface of the dielectric ceramic plate contacting with the upper surface of the stator, and by rotating the dielectric ceramic plate on the stator and changing the area of the fixed electrode opposing the movable electrode, the amount of capacitance generated between the fixed electrode and the movable electrode opposing each other through the dielectric ceramic plate is adjusted, and anchor portions are arranged so as to have a difference in level or to be stepped down from the surface of the fixed electrode and are embedded in the stator in the vicinity of the upper surface of the stator at the tip portions of the fixed electrode.

By arranging anchor portions so as to be stepped down from the surface of the fixed electrode, when the upper surface of a stator is polished in the process for forming the stator, the area of the fixed electrode does not change. Therefore, even if there are variations in the amount of polishing among stators, the area of the fixed electrode remains constant, and accordingly the area opposing the movable electrode, that is, the overlap portion is not altered, and the capacitance of the trimmer capacitor is maintained constant.

Furthermore, since the removal of the tip portions of a fixed electrode is prevented by arranging anchor portions at the tip portions of the fixed electrode, if excessive polishing is performed, the capacitance of the trimmer capacitor will not be reduced.

It is desirable that the tip portions of the fixed electrode have a cross-section that is exactly perpendicular or substantially perpendicular to the surface of the fixed electrode in the region extending from the surface of the fixed electrode to the anchor portions. In this way, the more accurate the cross section of the tip portion of a fixed electrode is, the more difficult it will be to change the area of the fixed electrode in the process of polishing the stators, and accordingly, it is possible to form an accurate trimmer capacitor in which the capacitance does not vary.

Furthermore, it is desirable that the anchor portion be arranged such that the tip portion and the anchor portion of the fixed electrode are supported by separate holding jigs and that the holding jig on the side of the anchor portion be moved substantially perpendicularly and in the opposite direction from the surface of the fixed electrode with respect to the holding jig on the side of the tip portion of the fixed electrode.

This is because anchor portions having a very accurate cross section in the region extending from a surface of the fixed electrode to the anchor portions at the tip portions of the fixed electrode can be formed by a simple method.

Anchor portions are further provided at the outer peripheral portion of the fixed electrode, and the anchor portions are substantially perpendicular to the surface of the fixed electrode and at least one of the width and the thickness thereof increases toward the tip portion.

In this way, by providing anchor portions in the circumferential portion in addition to the tip portions of a fixed electrode, the fixed electrode can be affixed in a stator at five points, i.e., the two anchor portions of the tip portion of the fixed electrode, the two anchor portions of the circumferential portion of the fixed electrode, and the lead-out portion of the fixed electrode. As a result, the mounting strength of the fixed electrode is further improved. Specifically, the fixed electrode is primarily affixed by three sections, i.e., the two anchor portions in the circumferential portion of the fixed electrode and the lead-out portion of the fixed electrode, and further by providing the anchor portions at the tip portions of the fixed electrode located outside a triangular area defined by connecting the three points, the tip portions of the fixed electrode are prevented from being lifted off.

Other features, elements, characteristics and advantages of the present invention will become apparent from the following detailed description of preferred embodiments thereof with reference to the attached drawings.

DETAILED DESCRIPTION OF PREFERRED EMBODIMENTS

Figure 1:
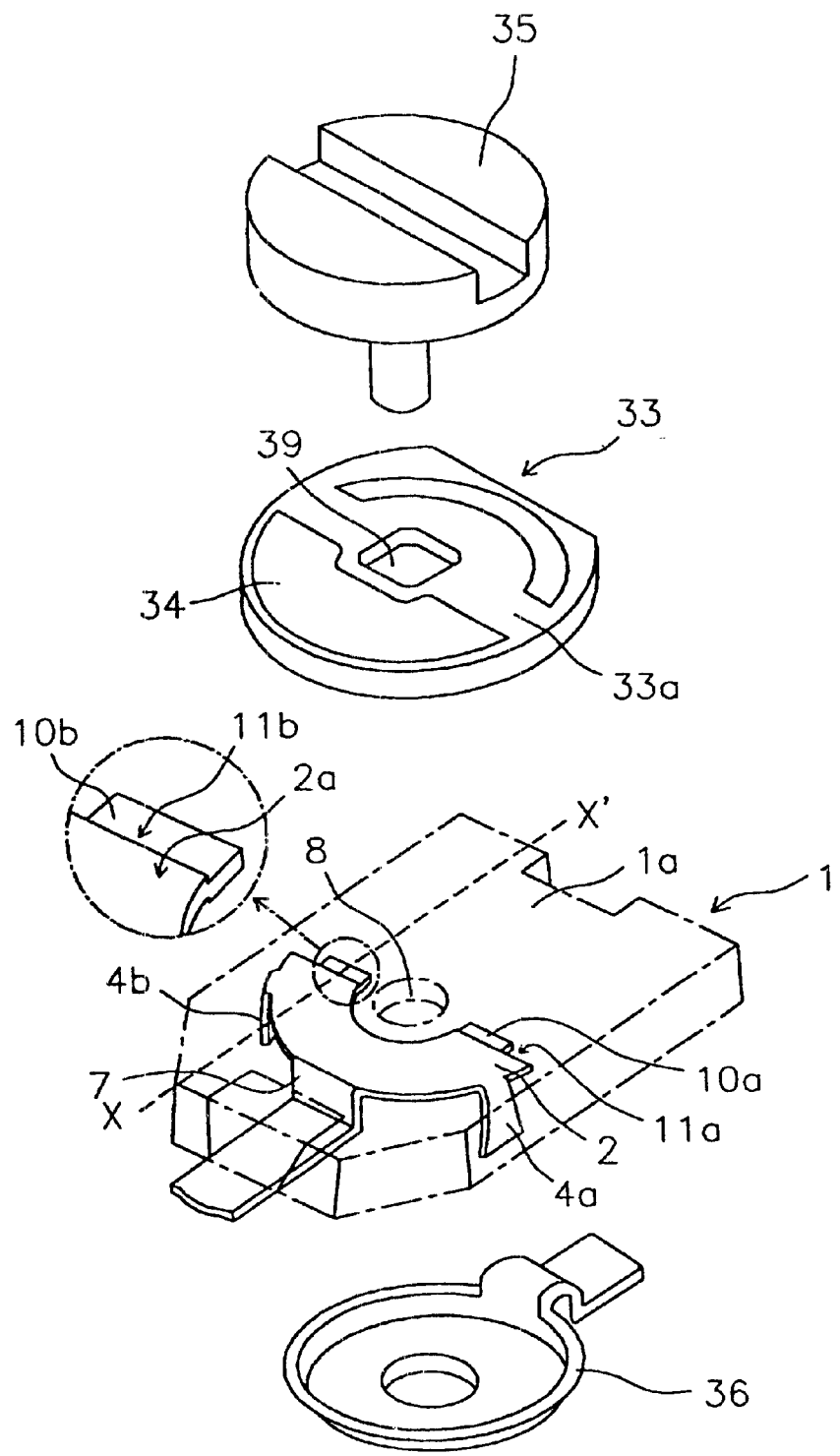
FIG. 1 is an exploded perspective view showing a trimmer capacitor according to a preferred embodiment of the present invention.
Figure 5:
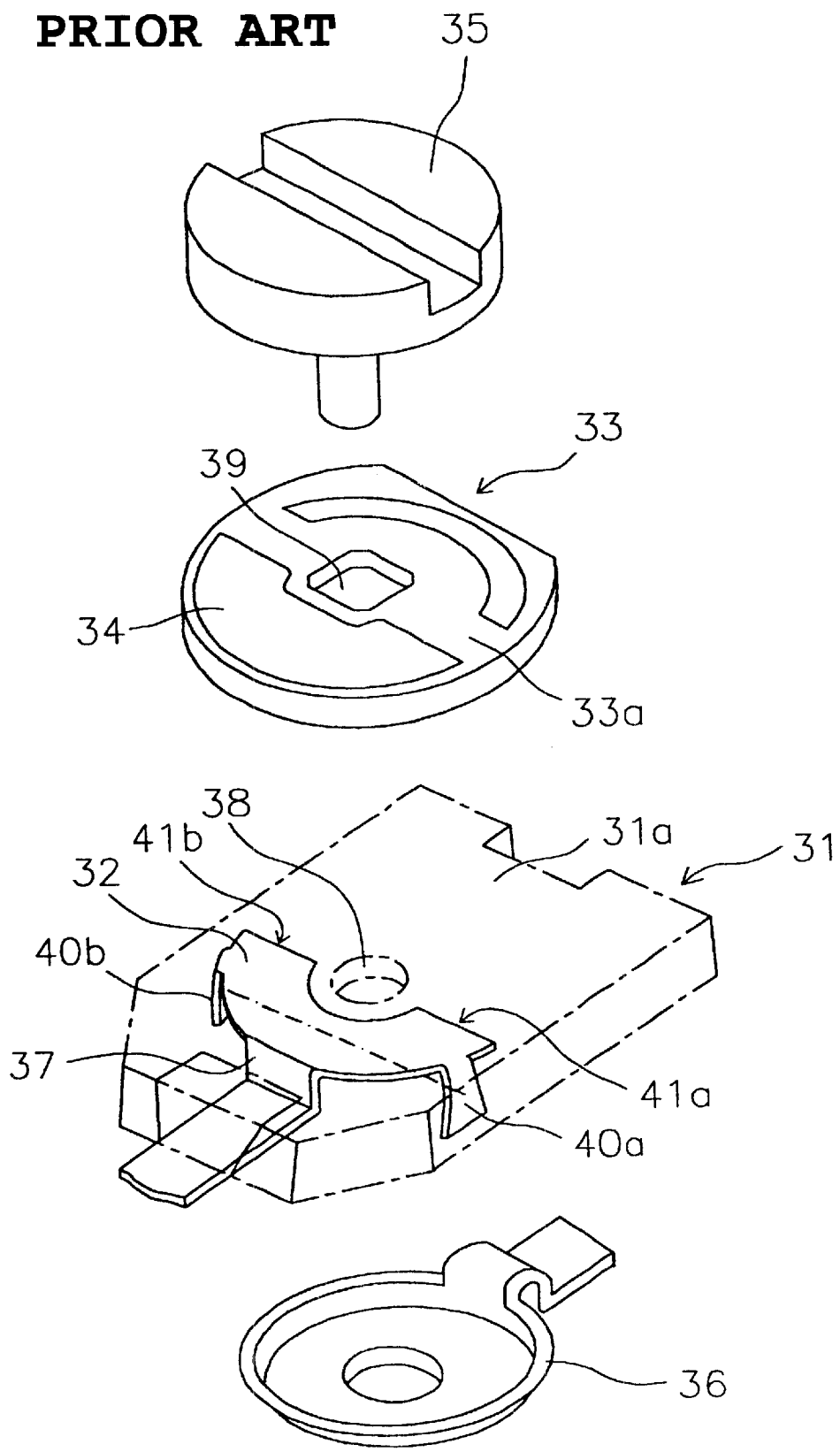
FIG. 5 is an exploded perspective view showing a conventional trimmer capacitor.
Figure 6:
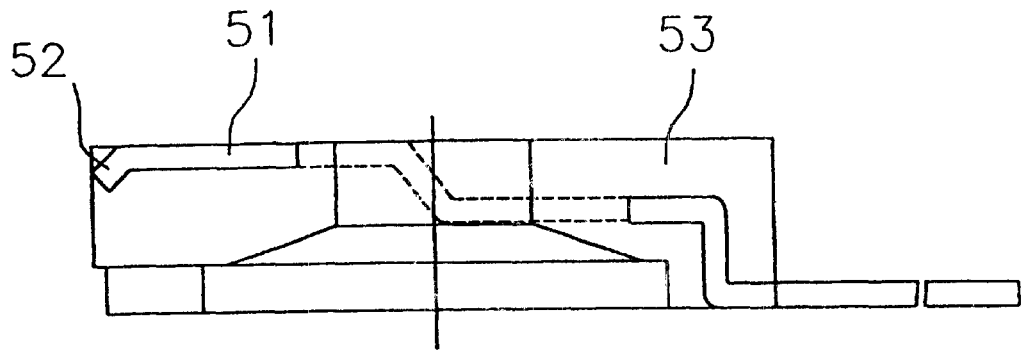
FIG. 6 is a sectional view showing a conventional trimmer capacitor.
Figure 7:
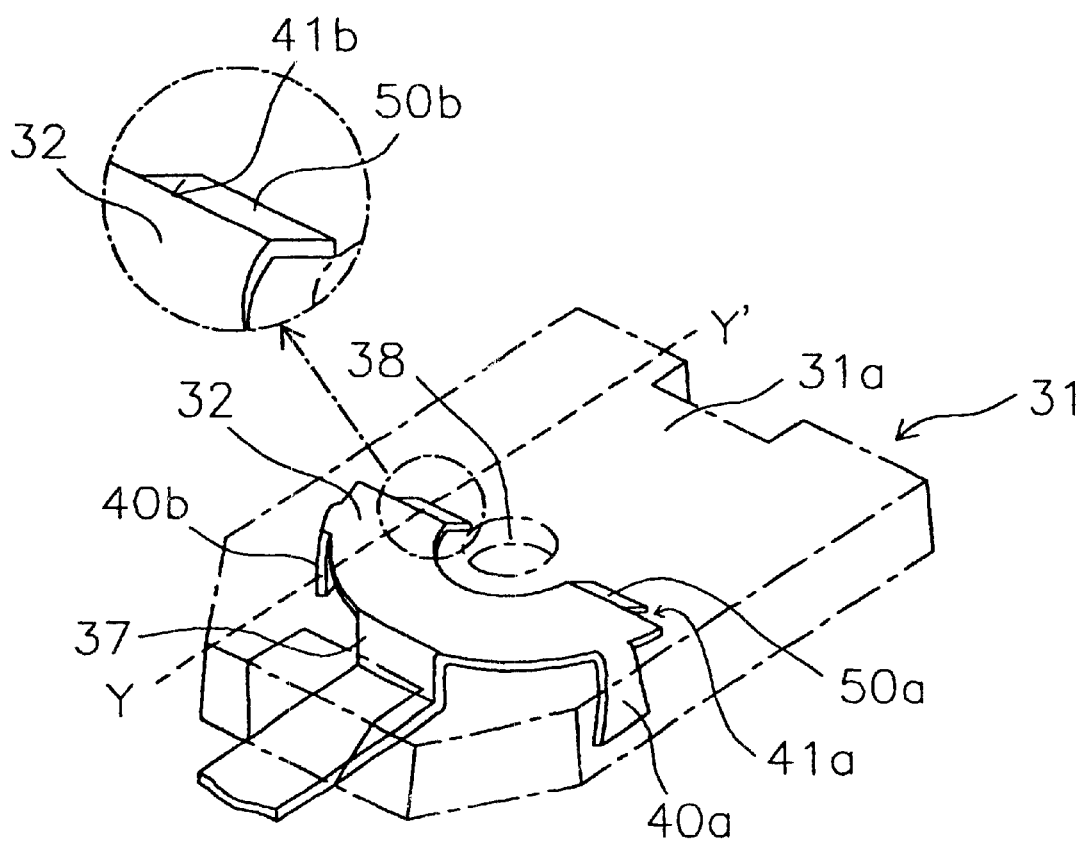
FIG. 7 is a perspective view showing a conventional stator.
Figure 8:
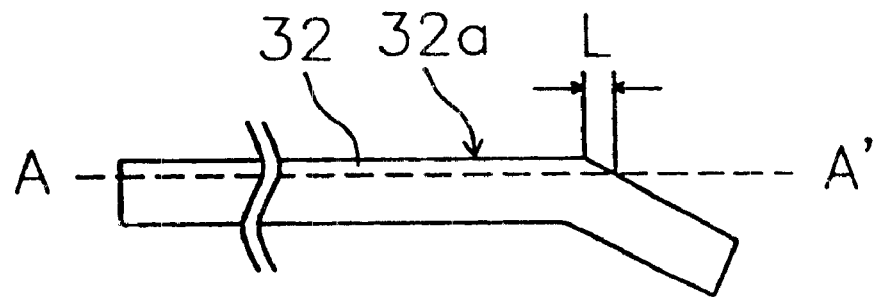
FIG. 8 is an enlarged sectional view taken along line Y–Y' of FIG. 7.

A trimmer capacitor according to one preferred embodiment will be described with reference to the drawings. FIG. 1 shows a trimmer capacitor according to one preferred embodiment of the present invention. Furthermore, since the construction of the other portions excluding the stator of this trimmer capacitor is similar to that of the conventional trimmer capacitor shown in FIG. 5, description will be made herein focusing on the construction of the stator that is characteristic of the present invention and anchor portions at the tip portions of a fixed electrode in particular. Furthermore, in FIGS. 1 and 5, the same reference numerals indicate equivalent portions.

As shown in FIG. 1, a stator 1 of the trimmer capacitor of this preferred embodiment of the present invention is preferably integrally molded using a resin 1*a* with a fixed electrode 2 having a substantially semicircular shape embedded in the stator 1, and the fixed electrode 2 is provided on the upper surface of the stator 1. The stator 1 also includes a shaft hole 8 provided therein to receive a metal adjustment shaft 35.

Then, the stator is molded such that anchor portions 10*a* and 10*b* which are arranged so as to be stepped down from the surface 2a of the fixed electrode are embedded near the upper surface of the stator at the tip portions of the fixed electrode 2 and anchor portions 4a and 4b which are provided in the outer peripheral portion of the fixed electrode 2 are embedded in the stator 1. The anchor portions 4a and 4b are substantially perpendicular to the surface 2a of the fixed electrode 2, and the width thereof increases toward the tip portion, although the thickness thereof is constant.

Next, a manufacturing method for a stator 1 to be used in the above trimmer capacitor is described. A fixed electrode 2 to be embedded in the stator 1 is formed preferably by press working a metal plate such that after the metal plate has been stamped into a predetermined shape, anchor portions 10a and 10b, anchor portions 4a and 4b, and a lead-out portion 7 are formed into a predetermined shape. The anchor portions 4a and 4b and the lead-out portion 7 are preferably formed by a common bending method, and hereinafter a method for forming the anchor portions 10a and 10b, which is a feature of preferred embodiments of the present invention, is described with reference to FIG. 3A to FIG. 3C.

Figure 3A:
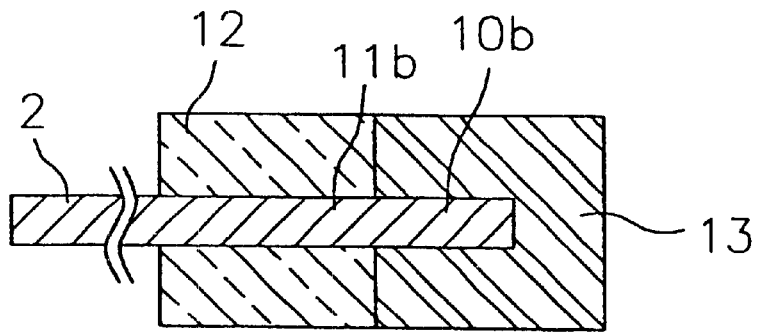
FIG. 3A to FIG. 3C show a manufacturing process for a stator to be used in a trimmer capacitor according to a preferred embodiment of the present invention and the drawings are enlarged sectional views taken along line X–X' in FIG. 1.
Figure 3B:
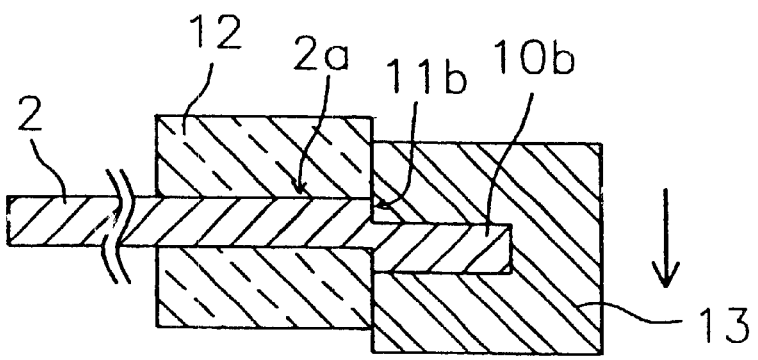
Figure 3C:
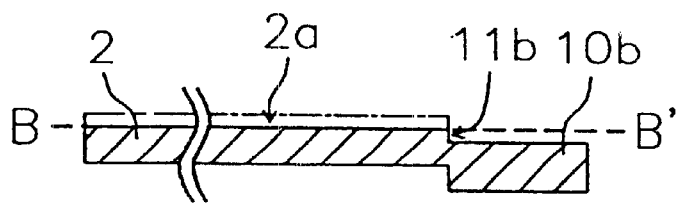

FIG. 3A to FIG. 3C show the processes when the fixed electrode 2 embedded in the stator 1 in FIG. 1 is formed, and show enlarged sectional views taken along line X–X' of FIG. 1. First, as shown in FIG. 3A, a tip portion 11b and a portion 10b' to define an anchor portion 10b of the fixed electrode 2 are supported by separate holding jigs 12 and 13, and the holding jig 13 on the side of the anchor portion 10b' is moved downward substantially perpendicularly and in the opposite direction from the surface 2a of the fixed electrode while the holding jig 12 on the side of the tip portion 11b of the fixed electrode is locked as shown in FIG. 3B. As a result, the portion 10b', which is to act as an anchor portion, slides substantially perpendicularly from the surface 2a of the fixed electrode. The anchor portion 10b having a cross-section that is exactly perpendicular or substantially perpendicular to the surface 2a of the fixed electrode in the region of the tip portion 11b of the fixed electrode 2 extending from the surface 2a of the fixed electrode to the anchor portion 10b so as to be stepped down from the surface 2a of the fixed electrode 2 can be formed by a simple method. Finally, the tip portion 11b and anchor portion 10b of the fixed electrode 2 are removed from the holding jigs 12 and 13. The other anchor portion 10a can also be formed by the same method.

A stator 1 is molded by embedding a fixed electrode 2 formed as described above into a resin 1a. The anchor portions 10a and 10b, anchor portions 4a and 4b, and lead-out portion 7 are embedded in the stator 1, and the fixed electrode 2 is affixed in the stator 1 by these five structures. Next, in order to increase the flatness of the surface of the stator 1 and the surface of the fixed electrode 2 embedded in the stator and to improve the characteristics of the trimmer capacitor, the upper surface of the stator 1 is polished. The polishing at this time is controlled so as not to reach the anchor portions 10a and 10b embedded inside the stator 1, and in the present preferred embodiment, the polishing is performed up to the line B–B' in FIG. 3C. Here, because the anchor portion 10b is arranged so as to be stepped down from the surface 2a of the fixed electrode and has a cross-section that is exactly perpendicular or nearly perpendicular to the surface 2a of the fixed electrode in the region extending from the surface 2a of the fixed electrode to the anchor portion 10b at the tip portion 11b of the fixed electrode 2, as shown in FIG. 3C, even if the upper surface of the stator is polished, the surface area of the fixed electrode does not significantly change. Accordingly, the area opposed to a movable electrode 34, that is, the overlapping area, is not changed by the polishing, and even if the degree of polishing varies among stators, it is possible to maintain the capacitance of each trimmer capacitor constant.

The trimmer capacitor is completed by assembling a stator 1 formed by the above-described method, a dielectric ceramic plate 33 provided with a movable electrode 34, a metal adjustment shaft 35, and a metal spring (rotor spring washer) 36.

The anchor portions 10a and 10b in the above-described trimmer capacitor which are located near the upper surface of the stator at the tip portions of the fixed electrode so as to be stepped down from the surface of the fixed electrode differ in the following ways from an L-shaped anchor portion where the tip portion of a fixed electrode is bent so as to be nearly perpendicular to the surface of the fixed electrode, and furthermore the end of the portion is bent nearly at a right angle again. That is, because the L-shaped anchor portion is formed by bending the end portion of the fixed electrode nearly at a right angle to the surface of the fixed electrode, the bend portion is slightly curved. In contrast to this, because the anchor portions 10a and 10b according to preferred embodiments of the present invention are formed so as to be substantially perpendicularly slid from the surface of the fixed electrode, when compared with the L-shaped anchor portion, the tip portion 11a of the fixed electrode 2 has a more accurate perpendicular section in the region from the surface 2a of the fixed electrode to the anchor portions 10a and 10b.

Furthermore, in the present preferred embodiment, because the fixed electrode 2 is fixed to the stator 1 by five structures, i.e., the anchor portions 10a and 10b, the anchor portions 4a and 4b, and the lead-out portion 7, the mounting strength of the fixed electrode 2 is further increased. Specifically, the fixed electrode is primarily affixed by three of the anchor portions 4a and 4b in the circumferential portion of the fixed electrode and the lead-out portion 7 of the fixed electrode, and furthermore, by providing the anchor portions 10a and 10b at the tip portions of the fixed electrode located outside a triangular area defined by connecting the three points the tip portions 11a and 11b of the fixed electrode are prevented from being lifted off.

Figure 2:
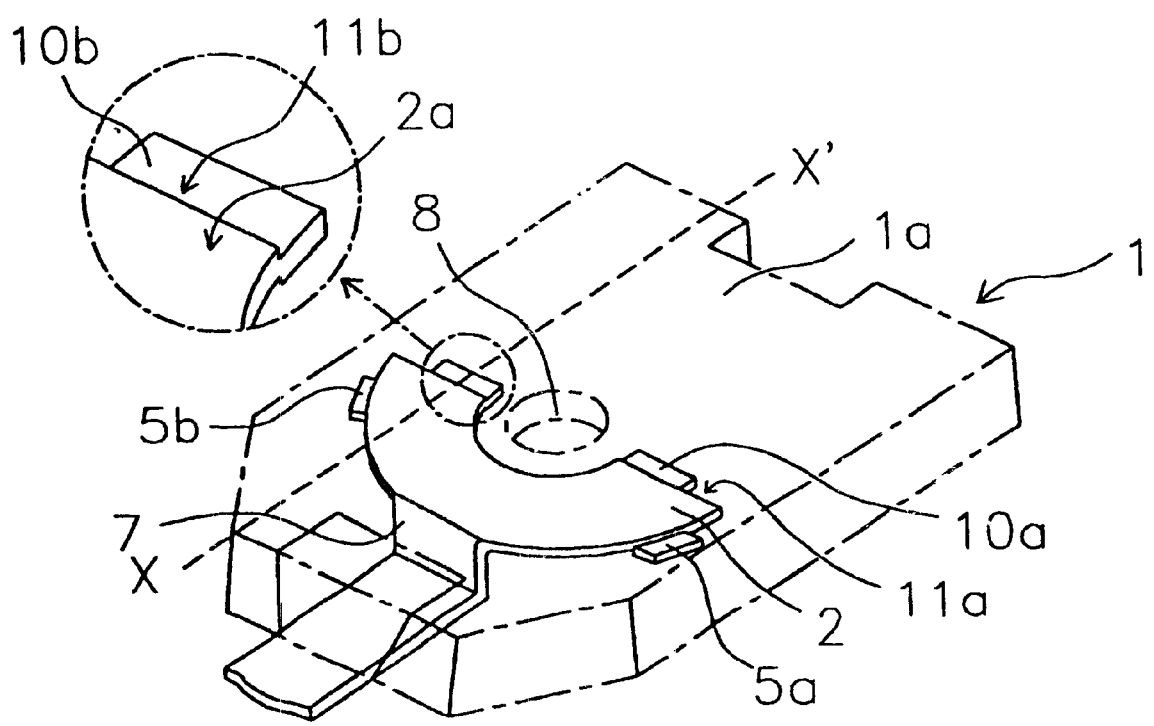
FIG. 2 is a perspective view showing a stator according to another preferred embodiment of the present invention.
Figure 4:
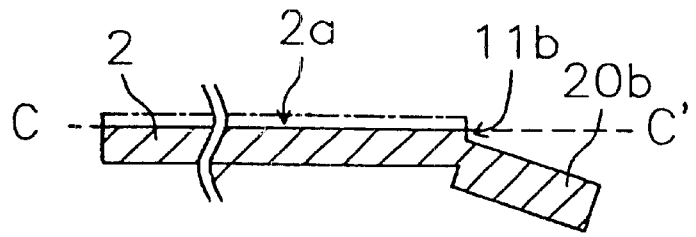
FIG. 4 is an enlarged sectional view of a stator to be used in a trimmer capacitor according to another preferred embodiment of the present invention.

Moreover, in the above-described preferred embodiment, the anchor portions 10a and 10b are disposed at the tip portions 11a and 11b of the fixed electrode and the anchor portions 4a and 4b are disposed in the circumferential portion of the fixed electrode. However, when the fixed electrode 2 can be adequately affixed by only three of the structures, i.e., the anchor portions 10a and 10b and the lead-out portion 7, the anchor portions 4a and 4b need not be disposed in the circumferential portion of the fixed electrode. Furthermore, as shown in FIG. 2, anchor portions 5a and 5b may be provided in the circumferential portion of the fixed electrode in the same way as the anchor portions 10a and 10b. Moreover, as shown in an enlarged sectional view in FIG. 4, the anchor portions 20a and 20b of the tip portions of the fixed electrode 2 may be arranged such that a stepped portion is provided and the anchor portions are bent obliquely downward.

As described above, according to various preferred embodiments of the present invention, because anchor portions are arranged to be stepped down from the surface of the fixed electrode, even if the upper surface of a stator is polished in the process for forming stators, the area of the fixed electrode does not change. Therefore, because the area of the fixed electrode is constant even if the amount of polishing varies among stators, the area opposed to a movable electrode 34, that is, the overlapping area, does not change, and it is possible to maintain the capacitance of a trimmer capacitor constant.

Furthermore, because the tip portions of a fixed electrode are prevented from being removed by anchor portions provided at the tip portions of the fixed electrode, even if excessive polishing occurs, the capacitance of the trimmer capacitor is not reduced.

Because the tip portions of the fixed electrode have an exactly perpendicular or nearly perpendicular section in the region from the surface of the fixed electrode to the anchor portions, when the upper surface of a stator is polished, the area of the fixed electrode hardly changes, and it is therefore possible to provide an accurate trimmer capacitor.

Furthermore, because the anchor portion is formed in such a way that the tip portion of a fixed electrode and the anchor portion are held by separate holding jigs and against the holding jig of the tip portion of the fixed electrode, the holding jig of the anchor portion is operated substantially perpendicularly in the opposite direction to the surface of the fixed electrode, and the anchor portion of the fixed electrode having a very accurate perpendicular section in the region from the surface of the fixed electrode to the anchor portion can be formed by a simple method.

In the circumferential portion of the fixed electrode, an anchor portion which is nearly perpendicular to the surface of the fixed electrode and in which the farther toward the tip portion, the larger at least one of the width and the thickness, may be further formed, and in this way, by providing anchor portions in the circumferential portion of the fixed electrode in addition to those at the tip portions of the fixed electrode, it is possible to fix the fixed electrode at five points, i.e., at the two anchor portions at the tip portions of the fixed electrode, at the two anchor portions in the circumferential portion of the fixed electrode, and at the lead-out portion of the fixed electrode, and accordingly it is possible to increase the mounting strength of the fixed electrode.

While the invention has been described with reference to preferred embodiments, it will be understood by those skilled in the art that other modifications can be made without departing from the spirit and scope of the invention.

What is claimed is:

1. A trimmer capacitor comprising:
   a stator having an upper surface and a lower surface, and a substantially semicircular fixed electrode mounted on the upper surface of the stator; and
   anchor portions arranged so as to be stepped down from the surface of the fixed electrode and embedded in the vicinity of the upper surface of the stator at tip portions of the fixed electrode;
   a dielectric ceramic plate having an upper surface and a lower surface, and a movable electrode mounted on the upper surface of the dielectric ceramic plate;
   wherein the lower surface of the dielectric ceramic plate is in contact with the upper surface of the stator and a capacitance is generated between the fixed electrode and the movable electrode opposed to each other through the dielectric ceramic plate and is adjustable by rotating the dielectric ceramic plate on the stator and changing the area of the fixed electrode opposed to the movable electrode.

2. A trimmer capacitor as claimed in claim 1, wherein the tip portions of the fixed electrode have a cross section that is substantially perpendicular to the surface of the fixed electrode in a region extending from the surface of the fixed electrode to the anchor portions.

3. A trimmer capacitor as claimed in claim 1, wherein the anchor portions are arranged such that the tip portions and the anchor portions of the fixed electrode are held by separate holding jigs and that the holding jig on the side of the anchor portions are moved substantially perpendicularly and in the opposite direction from the surface of the fixed electrode with respect to the holding jig on the side of the tip portions of the fixed electrode.

4. A trimmer capacitor as claimed in claim 1, wherein additional anchor portions are provided at an outer peripheral portion of the fixed electrode, and the anchor portions are substantially perpendicular to the surface of the fixed electrode and at least one of the width and the thickness thereof increases toward the tip portion.

5. A trimmer capacitor as claimed in claim 3, wherein additional anchor portions are provided at an outer peripheral portion of the fixed electrode, and the additional anchor portions are substantially perpendicular to the surface of the fixed electrode and at least one of the width and the thickness thereof increases toward tip portions of the additional anchor portions.

6. A trimmer capacitor as claimed in claim 1, wherein the stator includes an integrally molded resin body having the fixed electrode disposed therein.

7. A trimmer capacitor as claimed in claim 1, wherein at least four anchor portions are embedded in the stator so as to be substantially perpendicular to the surface of the fixed electrode.

8. A trimmer capacitor as claimed in claim 1, wherein the width of each of the anchor portions increases toward the tip portion there.

9. A trimmer capacitor as claimed in claim 1, wherein the fixed electrode is fixed in the stator by each of the anchor portions and a lead out portion.

10. A trimmer capacitor as claimed in claim 1, wherein the fixed electrode is fixed in the stator at five points.

11. A trimmer capacitor as claimed in claim 1, wherein the fixed electrode is fixed in the stator at three points.

12. A trimmer capacitor as claimed in claim 1, further comprising four of the anchor portions and a lead out portion, the fixed electrode being fixed in the stator by each of the four anchor portions and the lead-out portion.

13. A trimmer capacitor as claimed in claim 1, wherein the anchor portions have a cross-section that is exactly perpendicular or substantially perpendicular to the surface of the fixed electrode in the region of the tip portion of the fixed electrode.

* * * * *